United States Patent

Bergue et al.

[11] Patent Number: 5,933,951
[45] Date of Patent: Aug. 10, 1999

[54] PROCESS FOR MANUFACTURING A HOLLOW TURBOMACHINE BLADE AND A MULTIPLE-ACTION FURNACE PRESS FOR USE IN SAID PROCESS

[75] Inventors: Jean-Pierre Serges Bergue, Soisy/Montmorency; Mathieu Philippe Albert Bichon, Ermont; Jean-François Georges Julien Lacuisse, Argenteuil; Alain Georges Henri Lorieux, Sannois, all of France

[73] Assignee: Societe Nationale D'Etude et de Construction de Moteurs D'Aviation "Snecma", Paris, France

[21] Appl. No.: 08/871,637

[22] Filed: Jun. 9, 1997

[30] Foreign Application Priority Data

Jun. 13, 1996 [FR] France .................... 96 07329

[51] Int. Cl.⁶ ............................................ B23P 15/00
[52] U.S. Cl. ................................. 29/889.72; 29/889.7
[58] Field of Search ...................... 29/889.7, 889.72; 228/157

[56] References Cited

U.S. PATENT DOCUMENTS

| | | | |
|---|---|---|---|
| 5,083,371 | 1/1992 | Leibfried et al. | ...................... 29/889.72 |
| 5,323,536 | 6/1994 | Fowler et al. | ........................ 29/889.72 |
| 5,419,040 | 5/1995 | Weisse et al. | ......................... 29/889.72 |
| 5,469,618 | 11/1995 | LeMonds et al. | .................... 29/889.72 |
| 5,479,705 | 1/1996 | Fowler et al. | ........................ 29/889.72 |
| 5,581,882 | 12/1996 | Fowler et al. | ........................ 29/889.72 |

FOREIGN PATENT DOCUMENTS

| | | |
|---|---|---|
| 0 700 738 A1 | 3/1996 | European Pat. Off. . |
| 2 096 513 | 10/1982 | United Kingdom . |
| WO 81/02128 | 8/1981 | WIPO . |

*Primary Examiner*—I Cuda
*Attorney, Agent, or Firm*—Oblon, Spivak, McClelland, Maier & Neustadt, P.C.

[57] ABSTRACT

A process for manufacturing a hollow turbomachine blade made from a type TA6V titanium alloy includes a hot forming step in which an element of the blade is isothermally shaped in a press at a temperature between 700° C. and 940° C. under the action of at least two stamps and a holding-clamp which press the blade element on a shaping die, while ensuring a controlled deformation rate so as to obtain a lengthening of the fibres, that is to say the elongation of the different fibres of the element, with a controlled distribution on both sides of the central fibre. A multiple-action furnace-press designed for carrying out the process is also described.

10 Claims, 7 Drawing Sheets

PROCESS FOR MANUFACTURING A HOLLOW TURBOMACHINE BLADE AND A MULTIPLE-ACTION FURNACE PRESS FOR USE IN SAID PROCESS

BACKGROUND OF THE INVENTION

1. Field of the Invention

The present invention relates to a process for the manufacture of a hollow turbomachine blade, particularly a large chord fan rotor blade, and to a multiple-action furnace press for use in the process.

The advantages of using large chord blades in turbomachines are particularly apparent in the case of the fan rotor blades in bypass turbo jet engines. However, such blades must cope with severe conditions of use and, in particular, must possess satisfactory mechanical characteristics combined with anti-vibration properties and resistance to impact by foreign bodies. The need to achieve sufficient speeds at the tips of the blades has also led to seeking a reduction in the mass of the blades, and this has been achieved, in particular, by using hollow blades.

2. Summary of the Prior Art

Figure 1:
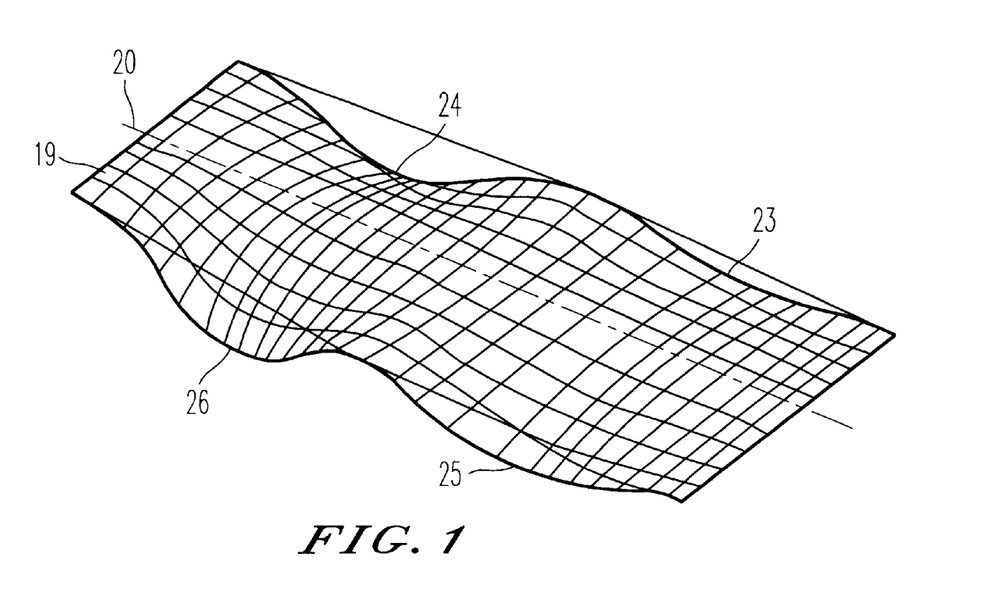
FIG. 1 represents diagrammatically the results of a digital simulation of a fibre lengthening operation to be carried out on a constituent part of a hollow blade assembly produced by the process in accordance with the invention.

EP-A-0700738 describes a process for the manufacture of a hollow turbomachine blade, especially a fan rotor blade having a large chord. In a first stage (a) of this process a computer-aided design and manufacturing (CAD/CAM) system is used to create, starting from a geometric definition of the blade to be obtained, a digital simulation consisting of computing for the constituent parts of the blade, on both sides of the central fibre, the lengths of the fibres as a function of their position relative to the axis 20 of the respective part 19 as shown in FIG. 1, the parts being flattened. Also carried out at this stage is a digital simulation of an operation to shape the parts by twisting, for comparison with the final result.

After this first stage the manufacturing process known from EP-A0700738 involves the following steps:

(b) die-forging the primary parts of the blade in a press.

(c) machining the primary parts;

(d) depositing diffusion barriers on at least one of the parts according to a predefined pattern;

(e) assembling the primary parts and diffusion welding them together under isostatic pressure;

(f) inflating the welded assembly using pressurized gas and superplastic shaping the assembly; and, (g) final machining of the shaped assembly One of the aims of the invention is to make it possible to perform, during the above sequence of operations, an additional shaping of the parts by twisting, without any risk of causing buckling type corrugations along the central fibre. These corrugations are generated by compression stresses induced at the time of the elongation of the lateral fibres resulting from the length differences between the initial flat part and the twisted part.

SUMMARY OF THE INVENTION

Accordingly, the invention provides a process for manufacturing a hollow turbomachine blade of the type which is known from EP-A-0700738, wherein said process includes a step of hot forming an element of the blade, which is made of a titanium alloy of TA6V type, in a press at a temperature between 700° C. and 940° C. using the action of at least two stamps and a holding clamp locking said element on a shaping die while ensuring a controlled deformation rate, so as to obtain a lengthening of the fibres of said element, that is to say the elongation of different fibres of said element, with a controlled distribution of said fibres on both sides of the central fibre.

It is known to carry out hot forming operations using special means including a heating enclosure associated with heating means, a press-bed structure associated with a power assembly comprising a plurality of actuators, and forming equipment. However, these known means are inadequate for carrying out the hot forming operation in the process in accordance with the invention.

Accordingly, the invention also provides a multiple-action furnace-press comprising: a heating enclosure; heating means associated with said heating enclosure; a press bed structure surrounding said heating enclosure and consisting of a lower metal plate, an upper metal plate, and columns inter-connecting said lower metal plate and said upper metal plate, said columns comprising prestressed tie rods; forming equipment comprising a lower soleplate incorporating a shaping die bounded at each end by a respective notch, an upper holding clamp for holding said element on said shaping die during deformation, and at least two upper stamps; multiple actuators connected to said holding clamp and said stamps; and a power unit for driving said multiple actuators.

The use of the multiple-effect furnace-press in accordance with the invention for the hot forming step in the blade manufacturing process enables the drawbacks of the earlier known processes to be avoided and blades to be obtained possessing improved geometric and mechanical characteristics optimized to the conditions of use, and also enables repeat quality to be ensured while facilitating relatively low cost manufacturing conditions.

DESCRIPTION OF THE PREFERRED EMBODIMENTS

Figure 2:
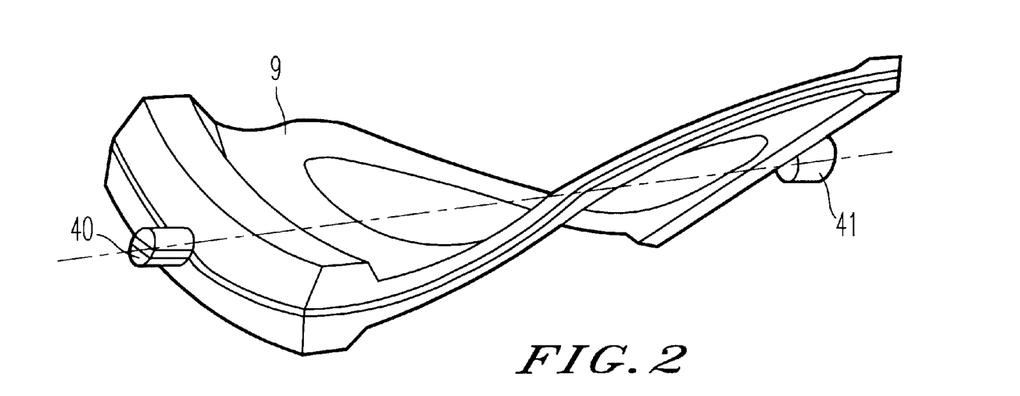
FIG. 2 shows a perspective view of the welded assembly of the hollow blade after twisting.

In the manufacture of a hollow turbomachine fan blade by a process in accordance with the invention, the element which is subjected to a hot forming operation in an intermediate manufacturing stage may be either a forged primary skin intended to constitute either the intrados or the extrados surface of the blade, or a central metal sheet intended to form stiffeners inter-connecting the intrados and extrados surface skins of the blade, or a welded assembly including the outer skins and at least one central metal sheet of the blade, or an unwelded pre-assembled unit including the outer skins and at least one central metal sheet of the blade, or a welded assembly including an intrados surface skin and an extrados surface skin. In the following description of a non-limitative embodiment of the invention the element is a welded assembly 9, shown in FIG. 2 in a stage in the manufacture of a hollow great chord fan blade for a turbomachine.

A preliminary digital simulation operation is carried out using a computer-aided design and manufacturing (CAD/CAM) system in a manner which is known, such as from the aforementioned EP-A-O 700 738. This simulation aims to maintain the lengths of the fibres on both sides of the neutral axis as a function of their position relative to the axis 20 of the element 19, as shown in FIG. 1. The control related to the lengthening of the fibres enables the thinning of the welded assembly to be estimated as a function of the distribution of the elongation ratio of the said fibres. A data processing computation then enables variations in thickness of the primary skins to be compensated so as to obtain the desired final thickness after all the stages of the manufacturing process.

On the basis of the elements thus determined, the process for manufacturing a hollow turbomachine blade, which in this example is a great chord fan rotor blade 9, includes a step of hot forming a welded assembly 9 made of a titanium alloy of the TA6V type, the hot forming step consisting of isothermally shaping the welded assembly at a temperature between 700° C. and 940° C. in a press under the action of at least two stamps and a holding clamp acting on the welded assembly placed on a shaping die, while ensuring a controlled deformation rate so as to achieve a lengthening of the fibres of each element of the assembly, i.e. the elongation of the different fibres of each element, with a controlled distribution of these fibres on both sides of the central fibre.

Preferably, the operation is carried out by keeping the welded assembly under the conditions for superplasticity of the titanium alloy used. Tests conducted on a TA6V type titanium alloy were carried out between 880° C. and 940° C., and the corresponding deformation rate was chosen to conform to the superplasticity condition, thus making it possible to avoid any trace of localized constriction of an element of the welded assembly 9.

Depending on the final shape of the blade to be obtained for a particular application, the operation of lengthening the fibres by hot forming may be preceded by a cambering operation performed on the root of the blade and in the area of the base of the aerofoil portion of the blade. In other cases, depending on the means used and/or on the result to be obtained, a single hot forming operation may be effective to carry out the cambering of the root and the base area of the aerofoil portion as well as the lengthening of the fibres.

Also depending on the particular application and the final shape of the blade to be obtained, the operation of lengthening the fibres of the welded assembly in the hot forming step may be followed by an inflation operation using pressurized gas and super-plastic shaping to achieve the profiles required for the blade.

As an alternative, after the fibre lengthening operation, an additional forming operation comprising twisting and calibration may be necessary. In this case, the twisting operation is preferably carried out after the fibre lengthening operation and without intermediate cooling of the welded assembly 9.

Figure 3:
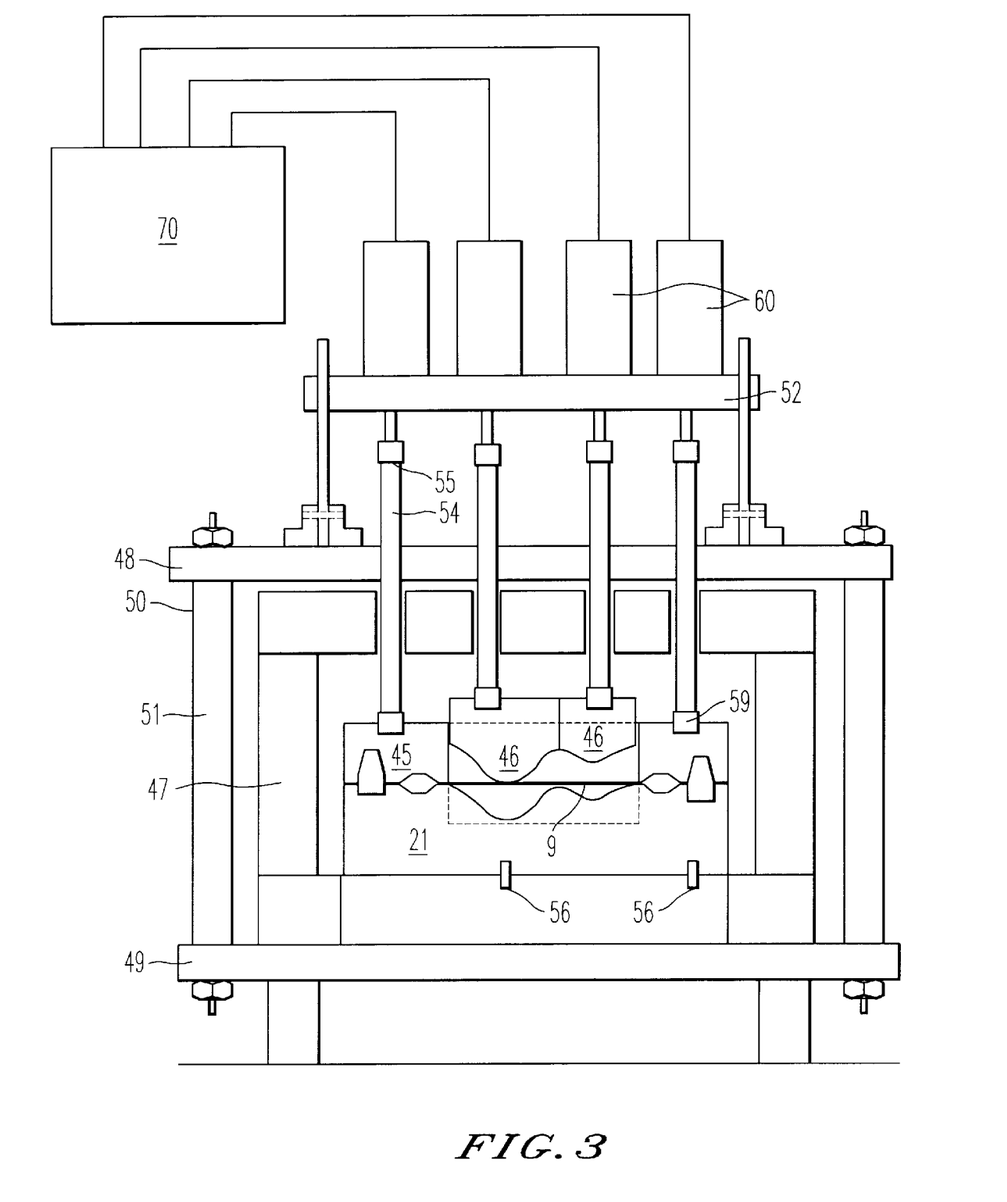
FIG. 3 shows a diagrammatic sectional view of a multiple-action furnace-press in accordance with the invention for use in the manufacture of a hollow turbomachine blade.
Figure 4:
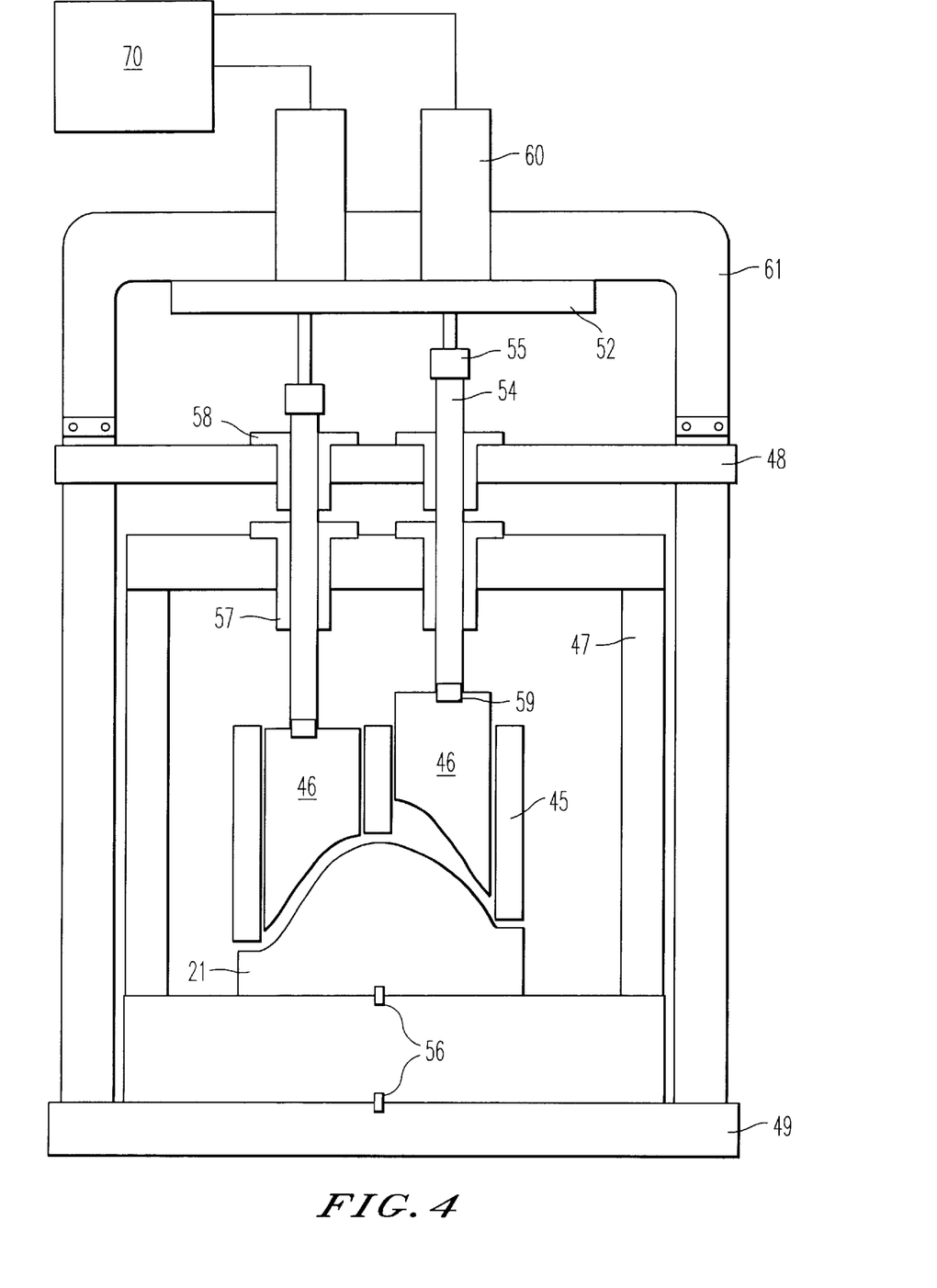
FIG. 4 shows a diagrammatic transverse sectional view of the multiple-action furnace-press shown in FIG. 3.

The multiple-action furnace-press shown in FIGS. 3 and 4 may be used for carrying out the hot forming operation for lengthening the fibres of the hollow turbomachine blade element 9 in the manufacturing process of the invention as just described.

This furnace-press comprises two distinct parts: a lower part including a heating enclosure 47, equipment 21 for lengthening the fibres, and a press bed structure; and an upper part including a power unit having as many actuators 60 as are necessary depending on the forming operation. The power unit may be connected to the lower part by an arched support 61, such as diagrammatically shown in FIG. 4.

The press bed structure is composed of two metal plates 48, 49 dimensioned according to the stresses to be generated, connected by four columns 50, each of which comprises a prestressed tie rod 51. Within this structure, a furnace 47 which is capable of being heated to a temperature between 700° C. and 940° C. houses the equipment for lengthening the fibres of the element to be shaped, particularly the welded assembly 9 of the hollow turbomachine blade.

The equipment for lengthening the fibres consists of three distinct parts: a soleplate 21 incorporating the die for lengthening the fibres; a holding clamp 45 for cambering the root and an adjacent part of the blade and for holding the welded assembly 9 during the lengthening of the fibres; and at least two stamps 46, there being three in the embodiment shown in the drawings.

Figure 9:
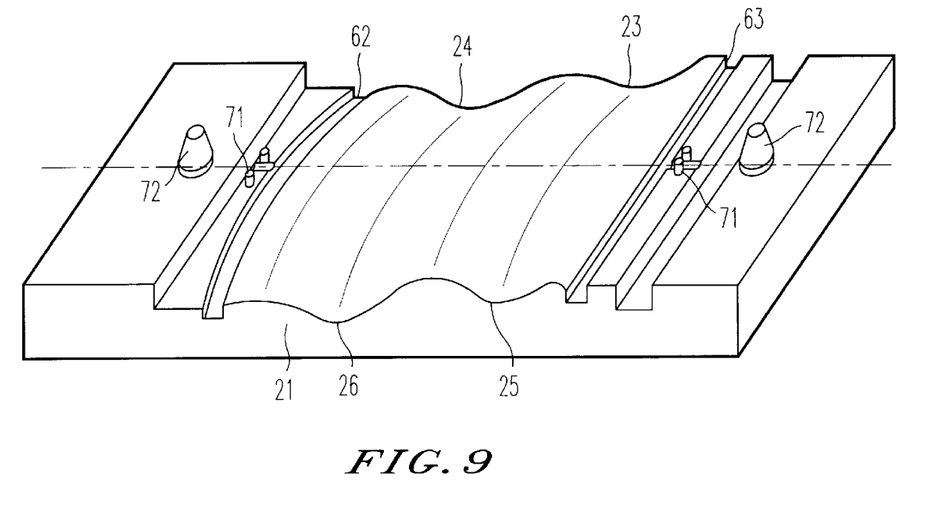
FIG. 9 shows a diagrammatic perspective view of the shaping equipment arranged inside the furnace-press of FIGS. 3 and 4.

In the forming tool shown in FIG. 9, the soleplate 21 is made of a refractory alloy or ceramic material and includes the CAD/CAM produced die for lengthening the fibres. This die comprises the solid parts of the root 62 and the tip 63 of the blade, one or more corrugations 23–24–25–26 corresponding to the desired elongations of the element of FIG. 1, and the pivots 40–41 of the welded assembly 9 of FIG. 2. Moreover, the soleplate includes guide pillars 72 for the positioning of the holding clamp 45, and pillars 71 for precisely positioning the welded assembly on the soleplate before shaping.

Figure 7:
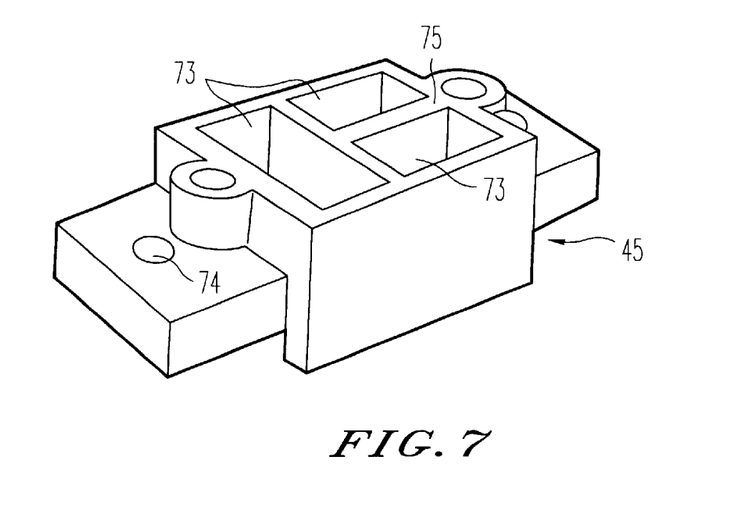
FIG. 7 shows a diagrammatic perspective view of the holding clamp of the furnace-press shown in FIGS. 3 and 4.

The holding clamp 45 shown in FIG. 7 consists of a unitary casting containing a number of cells 73 equal to the number of the stamps 46. It also has two holes 74 to ensure perfect positioning of the holding-clamp and of the stamps relative to the soleplate 21 when receiving the guide pillars 72. The central partition 75 formed between the two lateral cells serves to hold the welded assembly 9 along the central axis during the shaping operation as shown in FIG. 4. The holding-clamp 45 also includes impressions of the curvilinear or rectilinear root 62 and tip 63 of the blade element. The impression 62 also permits cambering of the root and the adjacent part of the blade element before immobilizing the welded assembly 9 during the fibre lengthening stage.

Figure 5:
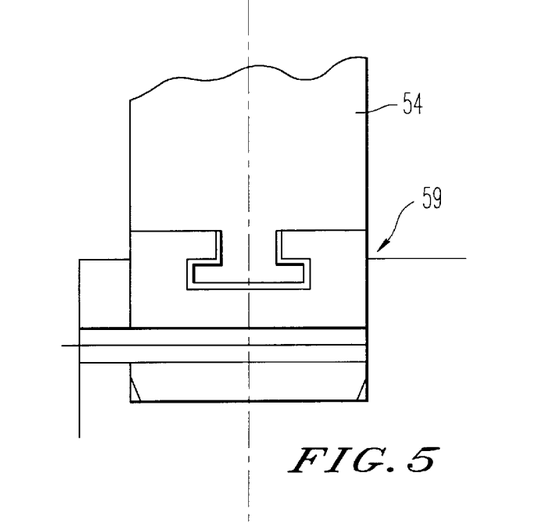
FIG. 5 shows a detail of the connection between an actuator and a transmission rod of the furnace-press shown in FIGS. 3 and 4.
Figure 5A:
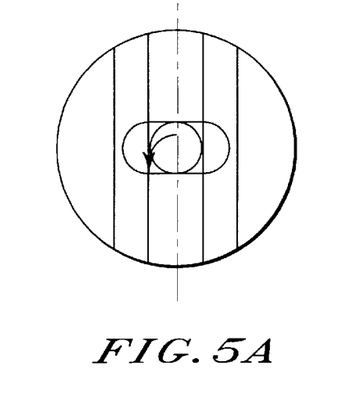
Figure 6:
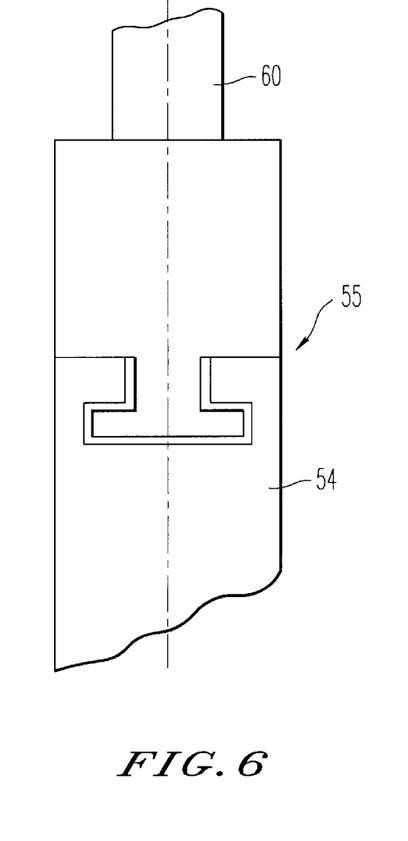
FIG. 6 shows a detail similar to that of FIG. 5 of the connection between a transmission rod and the holding clamp or a stamp of the furnace-press shown in FIGS. 3 and 4.

The soleplate 21 is fixed or merely set on the floor of the furnace 47. The holding-clamp 45 and the stamps 46 are movable, and are connected to the power unit by means of transmission rods 54 fitted with T-connections 55 and 59, as shown in detail in FIGS. 5 and 6, in order to accommodate the differential expansions at the holding-clamp 45 and the stamps 46, and also at the connections to the ends of the actuators 60. These T-connections thus provide a heat barrier between the ends of the actuators and the transmission rods. Moreover, the connections 59 between the holding-clamp 45 and the transmission rods 54 are able to permit rotation through 90° so as to disconnect the transmission bars 54 and permit the insertion and removal of the equipment for lengthening the fibres into and out of the heating enclosure or furnace 47.

Figure 8:
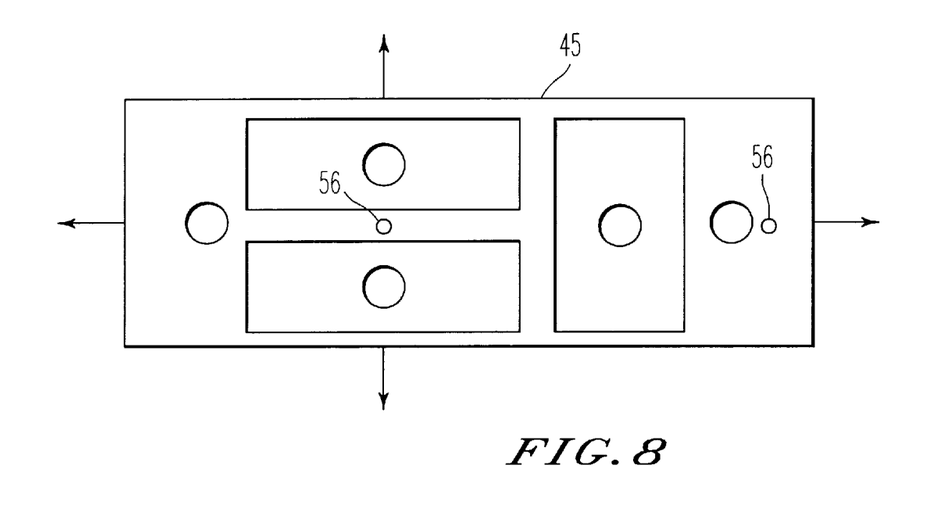
FIG. 8 shows a diagrammatic view of the placement of the centering pegs of the shaping equipment relative to the furnace-press.

In order to make the expansions unidirectional and thereby simplify the T-connections, the furnace 47 and the forming equipment 21 are judiciously positioned relative to the lower part of the press by means of centering pegs 56, as shown in FIGS. 3 and 4 and the detail of FIG. 8. These pegs 56 are positioned according to the arrangement of the stamps 46, generally along the longitudinal axis of the press, and according to the number of stamps, as shown diagrammatically in FIG. 8.

The guidance of the transmission rods 54 is ensured by collars 58 made of a ceramic compound and fitted in the upper metal plate 48 of the lower part of the press. The extent of these collars is sufficiently long to guide perfectly the group of transmission rods 54 passing through the roof of the furnace. Preformed sleeves 57 made of fibrous compounds and fitted with metal tubes of refractory material serve to cool the transmission rods 54 if the operating cycle is relatively short. However, for lengthy operations the transmission rods 54 are provided with channels for the flow of a cooling fluid.

The press control system provides fine control of the speed of the stamps 46 so as to stay permanently within the superplastic range of the material, such as the type TA6V titanium alloy, used for the manufacture of the hollow turbomachine blade, while ensuring a slow rate of deformation. The deformation rate is controlled by means of a hydraulic unit 70 which is capable of providing a range of speeds between 50 mm s$^{-1}$ and 0.05 mm s$^{-1}$.

An example of the use of the press to carry out a forming operation in accordance with the invention on a welded assembly 9 of a hollow turbomachine blade, will now be described. The heating enclosure 47 is raised to a temperature in excess of 880° C. for a forming operation on a TA6V titanium alloy. The holding-clamp 45 and the stamps 46 are in the raised position and provide a space allowing the introduction of the welded assembly 9 onto the soleplate 21 in the enclosure 47 using a loading device 79 as diagrammatically represented in FIG. 11. The device 79 has two clamps 80 for holding the welded assembly 9 by the pivots 40 and 41 and applying a longitudinal tractive force to the assembly.

Figure 11:
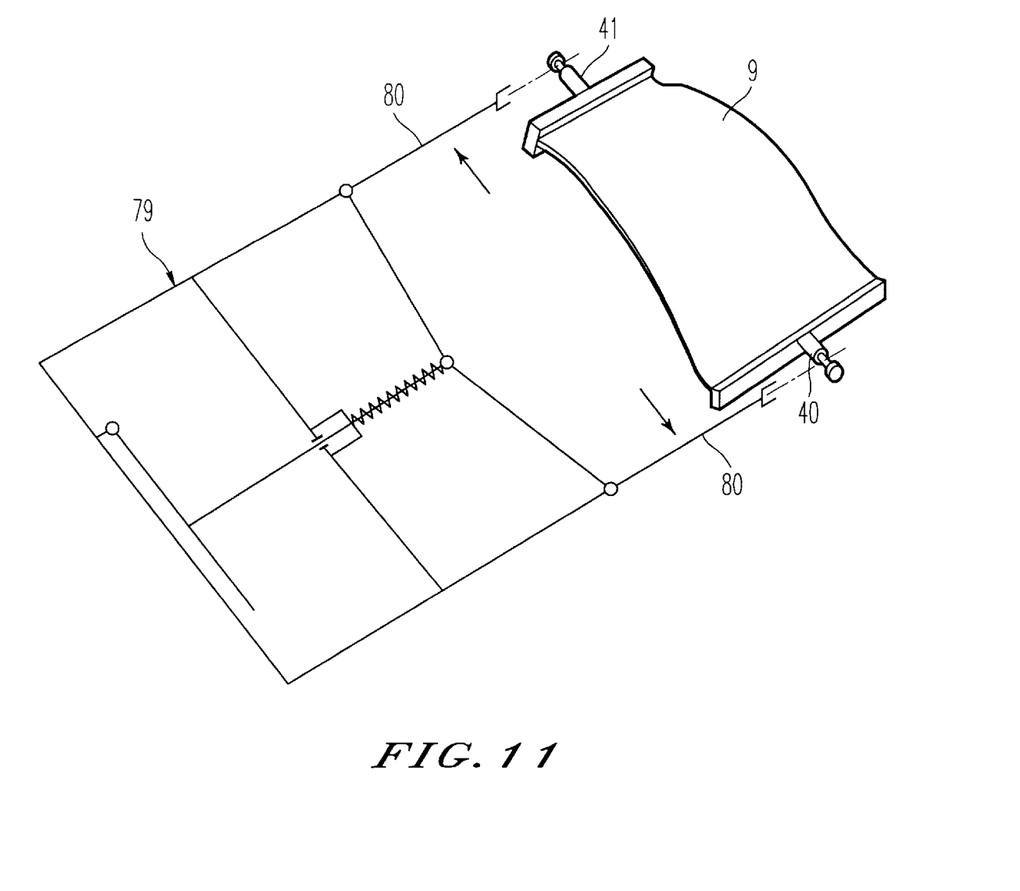

The welded assembly is positioned on the soleplate 21 by means of the pivots 40–41 being vertically guided between the cylindrical pillars 71 of the base. At this stage, the welded assembly 9 rests on the soleplate 21 until it reaches the forming temperature. As soon as the temperature is reached, the forming process begins by simultaneously moving the holding-clamp 45 and the stamps 46 down to a predetermined position at high speed, and then stopping the stamps 46. The downward movement of the holding-clamp 45 continues at superplastic forming speed to the end of stroke position, following which the lengthening of the fibres is then achieved by moving downwards one or more of the stamps 46 either simultaneously or individually. As soon as the end of stroke position has been reached by the complete set of stamps 46, the holding-clamp and the stamps are raised to their starting position. The unloading of the formed welded assembly is then effected by means of the device 79 which, thanks to the tractive force applied by the device, prevents buckling of the shaped unit 9 under its own weight.

Figure 10:
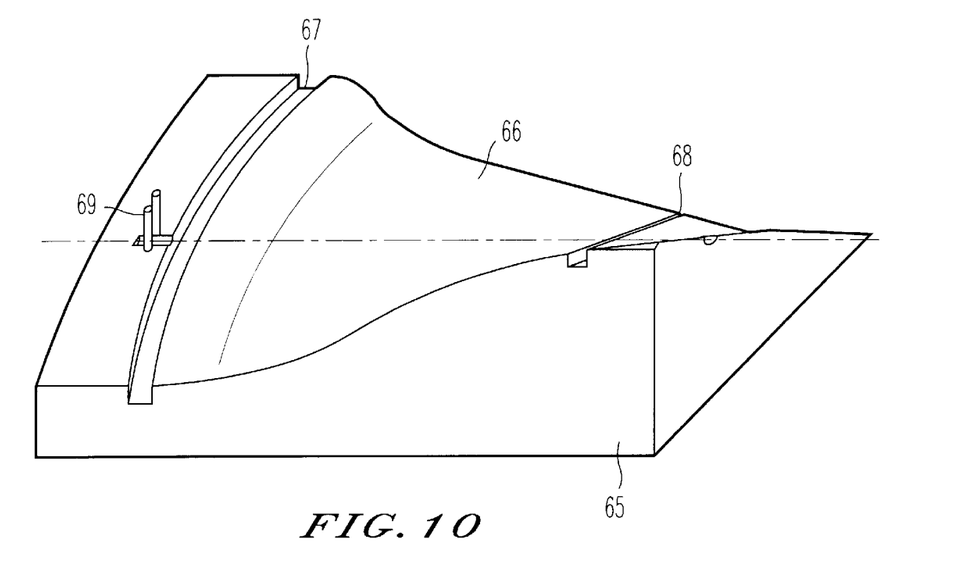
FIG. 10 shows a diagrammatic perspective view of further shaping equipment used for a twisting operation after the fibres have been set to length; and, FIG. 11 shows a diagrammatic view of a loading and unloading device for use with the furnace-press of FIGS. 3 and 4.

In the case where a twisting and calibrating operation is necessary after the forming operation involving lengthening the fibres, the welded assembly 9 is replaced between two tools of suitable shape at an isothermal temperature which is between 700° C. and 940° C. for a welded assembly made a titanium alloy of TA6V type. One example of a tool is shown in FIG. 10 and includes a soleplate 65 and a forming die 66 bounded at each end by grooves 67 and 68. The welded assembly 9 is positioned on the tool by means of its pivots 40 and 41 being guided vertically by cylindrical pillars 69 so as to maintain the central fibre defined by the pivots 40 and 41 in a vertical plane between the pillars 69 throughout the deformation.

We claim:

1. A process for manufacturing a hollow turbomachine blade, particularly a large chord fan rotor blade, from a plurality of primary parts, said process comprising the following steps:
   (a) using computer aided design and manufacturing (CAD/CAM) means to create, from a definition of said blade to be produced, a digital simulation of the flat form of the primary parts of said blade;
   (b) die-forging said primary parts of said blade;
   (c) machining said primary parts;
   (d) depositing diffusion barriers on at least one of said primary parts according to a predefined pattern;
   (e) assembling said primary parts and diffusion welding them together under isostatic pressure;
   (f) inflating the welded assembly of said primary parts using pressurized gas and superplasticly shaping said assembly; and,
   (g) final machining of said shaped assembly;
wherein said process also includes a step of hot forming an element of said blade by isothermally shaping said element, said element being made of a titanium alloy of TA6V type, in a press at a temperature between 700° C. and 940° C. using the action of at least two stamps and a holding clamp locking said element on a shaping die while ensuring a controlled deformation rate, so as to obtain a lengthening of the fibres of said element, that is to say the elongation of different fibres of said element, with a controlled distribution of said fibres on both sides of the central fibre.

2. A process according to claim 1, wherein the said hot forming step is carried out at a temperature between 880° C. and 940° C. and at a deformation rate corresponding to the superplasticity range of the titanium alloy from which said element is made, so as to avoid the risks of localized constriction.

3. A process according to claim 1 wherein said element is one of the die-forged primary parts of said blade, and said hot forming step is carried out on each of said die-forged primary parts.

4. A process according to claim 1, wherein said element is a metal sheet intended to form the inner part of said blade.

5. A process according to claim 1, wherein said element is a flat assembly composed of the unwelded primary parts of said blade.

6. A process according to claim 1, wherein said element is a flat assembly obtained by the assembling and diffusion welding of said primary parts of said blade.

7. A process according to claim 1, wherein said hot forming step is preceded by an operation to camber said element in the area of the joint between the root of said blade and the base of the aerofoil portion of the blade.

8. A process according to claim 1, wherein said hot forming step is operative to camber said element in the area of the root of the blade and the base of the aerofoil position, and is then operative to lengthen the fibres in the same operational sequence.

9. A process according to claim 1, wherein said hot forming step is followed in sequence and without intermediate cooling by a shaping operation involving twisting.

10. A process according to claim 1, wherein traction is maintained between opposite ends of said element during the placement and removal of said element into and out of said press.

* * * * *